(12) United States Patent
Teves

(10) Patent No.: US 11,720,294 B2
(45) Date of Patent: Aug. 8, 2023

(54) INFORMATION PROCESSING APPARATUS MANAGING USE OF DOCUMENT AND DOCUMENT MANAGEMENT METHOD THEREFOR

(71) Applicant: KYOCERA Document Solutions Inc., Osaka (JP)

(72) Inventor: Hara Danica Teves, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/705,227

(22) Filed: Mar. 25, 2022

(65) Prior Publication Data
US 2022/0308804 A1  Sep. 29, 2022

(30) Foreign Application Priority Data
Mar. 29, 2021  (JP) .................................. 2021-055931

(51) Int. Cl.
*G06F 3/12*  (2006.01)
(52) U.S. Cl.
CPC .......... *G06F 3/1205* (2013.01); *G06F 3/1238* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 2007/0003340 A1* | 1/2007 | Yoshino | ............... | G03G 21/046 399/366 |
| 2007/0192876 A1* | 8/2007 | Takeuchi | .............. | G06F 21/608 726/29 |
| 2008/0018942 A1* | 1/2008 | Komiya | ............... | G03G 21/046 358/3.28 |
| 2008/0028221 A1* | 1/2008 | Endo | .................. | H04N 1/32144 713/176 |
| 2009/0021765 A1* | 1/2009 | Takahashi | .............. | G03G 21/04 358/1.14 |
| 2009/0262390 A1* | 10/2009 | Tanaka | ............... | H04N 1/00883 358/1.15 |

(Continued)

FOREIGN PATENT DOCUMENTS

JP    2013098773 A    5/2013

*Primary Examiner* — Henok Shiferaw
(74) *Attorney, Agent, or Firm* — IP Business Solutions, LLC

(57) ABSTRACT

The information processing apparatus includes an input device, a communication device, and a control device. The image indicated by the document is input to the input device. The communication device communicates with other electronic apparatuses. The control device includes a processor, and the processor functions as a controller by executing a control program. The controller detects a code indicating permission or prohibition of a job related to the document and a provider of the document from the input image, and determines the permission or prohibition of the job related to the document and the provider of the document on the basis of the detected code, and, in a case where it is determined that the job related to the document is permitted, executes the job related to the document, and notifies the provider that the job related to the document has been executed via the communication device.

10 Claims, 11 Drawing Sheets

(56) References Cited

U.S. PATENT DOCUMENTS

| | | | |
|---|---|---|---|
| 2010/0060923 A1* | 3/2010 | Kakutani | H04N 1/00848 |
| | | | 358/1.14 |
| 2010/0195152 A1* | 8/2010 | Tokumaru | H04N 1/32229 |
| | | | 726/28 |
| 2010/0328728 A1* | 12/2010 | Kakutani | H04N 1/00846 |
| | | | 358/448 |
| 2011/0304879 A1* | 12/2011 | Kakutani | G03G 21/046 |
| | | | 358/1.15 |
| 2012/0224213 A1* | 9/2012 | Imamura | H04N 1/32133 |
| | | | 358/1.14 |
| 2018/0249037 A1* | 8/2018 | Shono | H04N 1/32149 |

* cited by examiner

EXECUTION OF JOB

NUMBER OF EXECUTIONS JN OF JOB

TYPE OF JOB　COPY JOB

TYPE OF ORIGINAL DOCUMENT　ORIGINAL COPY

ID XXX OF DOCUMENT PROCESSED BY JOB

IP ADDRESS OF IMAGE FORMING APPARATUS

INFORMATION PROCESSING APPARATUS MANAGING USE OF DOCUMENT AND DOCUMENT MANAGEMENT METHOD THEREFOR

INCORPORATION BY REFERENCE

This application claims priority to Japanese Patent Application No. 2021-055931 filed on Mar. 29, 2021, the entire contents of which are incorporated by reference herein.

BACKGROUND

The present disclosure relates to an information processing apparatus and a document management method for managing copying of a document or the like, and in particular, a technique for notifying a document provider that copying or the like has been executed.

In an image forming apparatus, an original is read by an image reading device, and an original image obtained through the reading is printed on recording paper by an image forming device, that is, so-called copying is performed, but it is desirable that the copying is restricted depending on details of the original image. For example, there is an image forming apparatus in which an original is read to generate an original image, a code is detected from the original image, control information is extracted from the code, and the original image is not output in a case where the control information indicates that output is not possible, and the original image is output in a case where the control information indicates that output is possible.

SUMMARY

As one aspect of the present disclosure, a technique that is a further improvement of the above technique is proposed.

According to one aspect of the present disclosure, there is provided an information processing apparatus including an input device, a communication device, and a control device. An image indicated by a document is input to the input device. The communication device communicates with other electronic apparatuses. The control device includes a processor, and functions as a controller by the processor executing a control program. The controller detects a code indicating permission or prohibition of a job related to the document and a provider of the document from the input image, determines the permission or prohibition of the job related to the document and the provider of the document on the basis of the detected code, and, in a case where it is determined that the job related to the document is permitted, executes the job related to the document, and notifies the provider that the job related to the document has been executed via the communication device.

According to another aspect of the present disclosure, there is provided a document management method including: an input step of inputting an image indicated by a document; a detection step of detecting a one-dimensional or two-dimensional code indicating permission or prohibition of a job related to the document and a provider of the document from the image input in the input step; a determination step of determining the permission or prohibition of the job related to the document and the provider of the document on the basis of the one-dimensional or two-dimensional code detected in the detection step; a processing step of, in a case where the permission of the job related to the document is determined in the determination step, executing the job related to the document; and a notification step of, when the job related to the document is executed in the processing step, notifying the provider determined in the determination step that the job related to the document has been executed.

BRIEF DESCRIPTION OF THE DRAWINGS

FIG. 10 is a diagram exemplifying an email transmitted to a provider of the original in a case where a job related to the original is permitted and executed.

DETAILED DESCRIPTION

Figure 1:
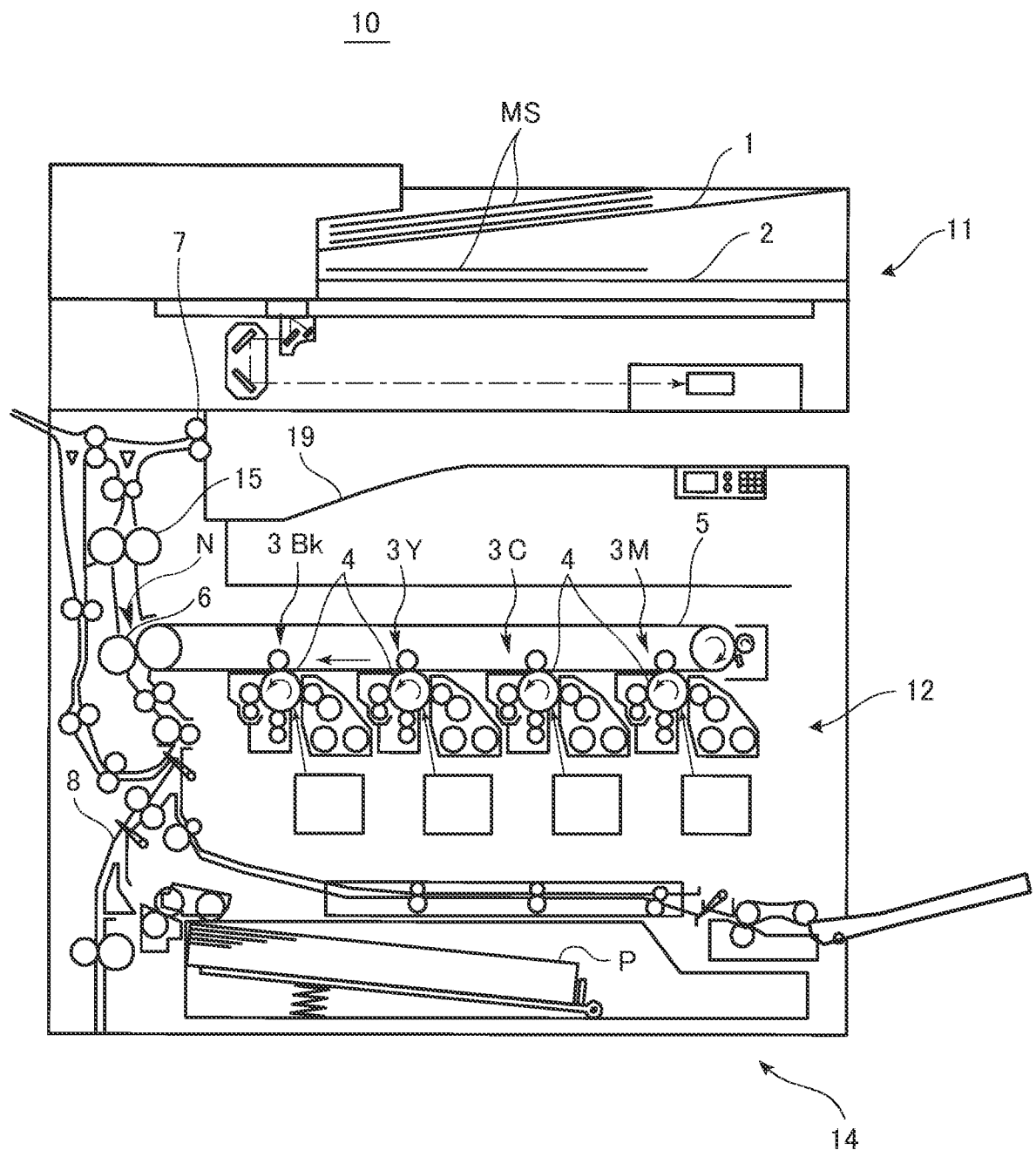
FIG. 1 is a sectional view illustrating an image forming apparatus which is an embodiment of an information processing apparatus according to the present disclosure.

Hereinafter, embodiments of the present disclosure will be described with reference to the drawings. FIG. 1 is a sectional view illustrating an image forming apparatus which is an embodiment of an information processing apparatus according to the present disclosure. This image forming apparatus 10 is a multi-function peripheral (MFP) having a plurality of functions such as a copy function and a printer function. The image forming apparatus 10 includes an image reading device 11 and an image forming device 12.

The image reading device 11 has an imaging element that optically reads an original, and an analog output of the imaging element is converted into a digital signal to generate image data (hereinafter, simply referred to as an original image) indicating an original image.

The image forming device 12 forms the original image on recording paper, and has an image forming device 3M for magenta, an image forming device 3C for cyan, an image forming device 3Y for yellow, and an image forming device 3Bk for black. In each of the image forming devices 3M, 3C, 3Y, and 3Bk, a surface of a photoconductor drum 4 is uniformly charged, the surface of the photoconductor drum 4 is exposed, an electrostatic latent image is formed on the surface of the photoconductor drum 4, the electrostatic latent image on the surface of the photoconductor drum 4 is developed into a toner image, and the toner image on the surface of the photoconductor drum 4 is primarily transferred to an intermediate transfer belt 5. Consequently, a color toner image is formed on the intermediate transfer belt 5. The color toner image is secondarily transferred to recording paper P conveyed from a paper feed device 14 through a conveyance path 8 in a nip region N between the intermediate transfer belt 5 and a secondary transfer roller 6.

Thereafter, the recording paper P is heated and pressurized by a fixing device 15, the toner image on the recording paper P is fixed through thermocompression bonding, and the recording paper P is discharged to a discharge tray 19 through a discharge roller 7.

Figure 2:
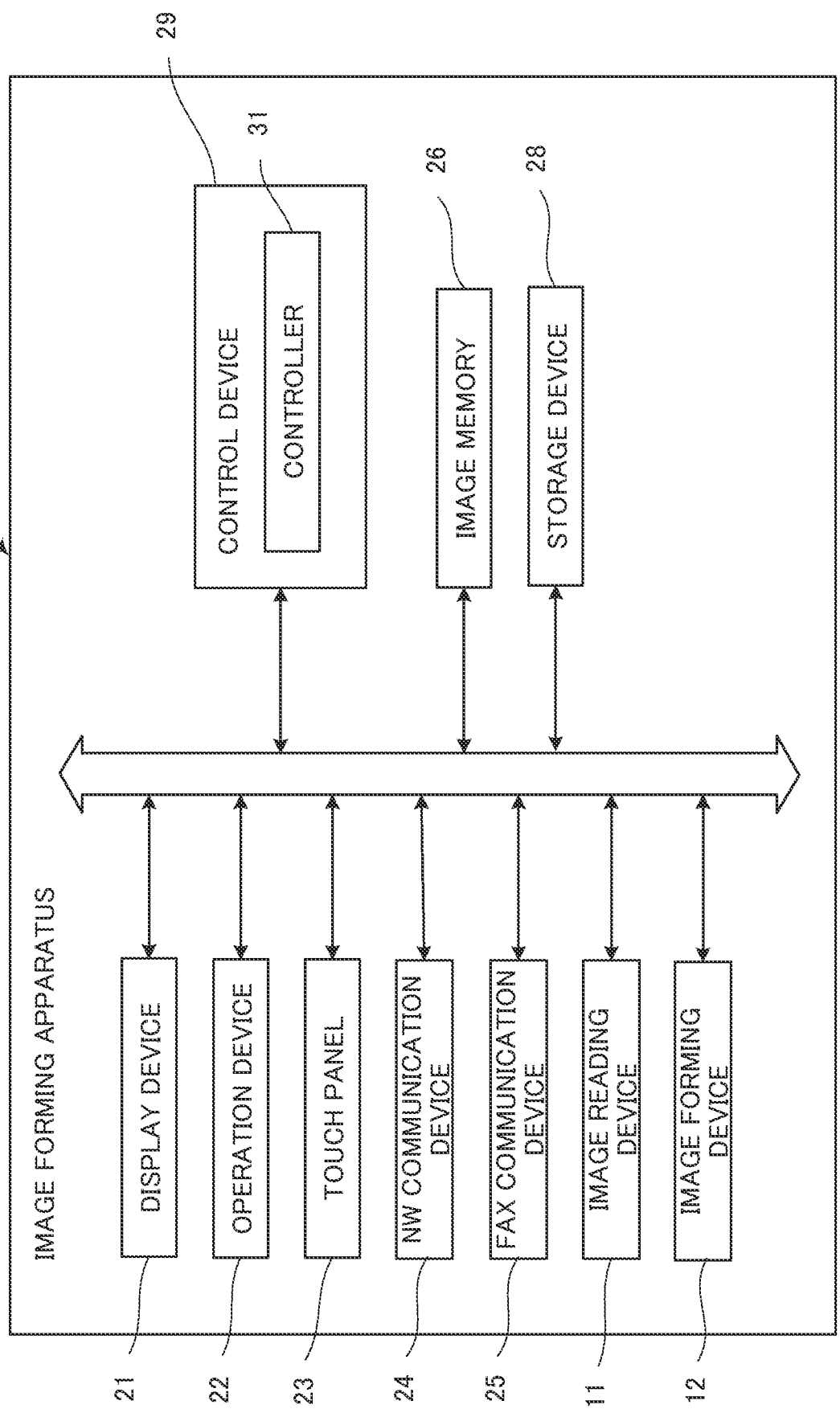
FIG. 2 is a functional block diagram illustrating a main internal configuration of the image forming apparatus according to the present embodiment.

Next, a configuration related to control of the image forming apparatus 10 will be described. FIG. 2 is a functional block diagram illustrating a main internal configuration of the image forming apparatus 10. As illustrated in FIG. 2, the image forming apparatus 10 includes an image reading device 11 (an example of an input device in the claims), an image forming device 12, a display device 21, an operation device 22, a touch panel 23, a network communication device (NW communication device) 24, a facsimile communication device (FAX communication device) 25, an image memory 26, a storage device 28, and a control device 29. These constituents are capable of transmitting and receiving data or signals to and from each other via a bus.

The display device 21 is configured with a liquid crystal display (LCD), an organic EL (organic light-emitting diode: OLED) display, or the like.

The operation device 22 is provided with physical keys such as a numeric keypad, an enter key, and a start key.

A touch panel 23 is disposed on a screen of the display device 21. The touch panel 23 is a so-called resistance film type or capacitance type touch panel, detects contact (touch) of a user's finger or the like on the touch panel 23 together with a contact position, and outputs a detection signal indicating coordinates of the contact position to a controller 31 or the like which will be described later of the control device 29. Consequently, it is possible to operate a graphical user interface (GUI) or the like displayed on the screen of the display device 21 via the touch panel 23.

The network communication device (NW communication device) 24 is a communication interface including a communication module such as a LAN chip (not illustrated), is connected to other terminal apparatuses via a wired or wireless LAN, and transmits and receives data to and from the other terminal apparatuses.

The facsimile communication device (FAX communication device) 25 transmits and receives an original image indicating details of an original indicating an image to and from another image forming apparatus, a facsimile apparatus, and the like via a network. The image memory 26 stores an original image indicating details of an original read by the image reading device 11.

The storage device 28 is a large-capacity storage device such as a solid state drive (SSD) or a hard disk drive (HDD), and stores various application programs and various pieces of data.

The control device 29 is configured with a processor, a random access memory (RAM), a read only memory (ROM), and the like. The processor is, for example, a central processing unit (CPU), an application specific integrated circuit (ASIC), a micro processing unit (MPU), or the like. The control device 29 functions as the controller 31 when a control program stored in the ROM or the storage device 28 is executed by the processor.

The controller 31 comprehensively controls the image forming apparatus 10. The control device 29 is connected to the image reading device 11, the image forming device 12, the display device 21, the operation device 22, the touch panel 23, the network communication device 24, the facsimile communication device 25, the image memory 26, the storage device 28, and the like. The controller 31 controls an operation of these constituents and transmits and receives signals or data to and from each constituent.

The controller 31 serves as a processor that executes various processes necessary for image formation by the image forming apparatus 10. The controller 31 receives a detection signal output from the touch panel 23, or an instruction input by a user on the basis of an operation on the physical key of the operation device 22. The controller 31 has a function of controlling a display operation of the display device 21, and a function of controlling a communication operation of the network communication device 24 and the facsimile communication device 25.

In the image forming apparatus 10 having such a configuration, for example, the user operates the GUI displayed on the screen of the display device 21 via the touch panel 23, inputs a selection instruction for selecting a copy job, sets an original in the image reading device 11, and operates the start key of the operation device 22 to input a copy execution instruction. In this case, the controller 31 causes the image reading device 11 to read the original according to the input selection instruction and copy execution instruction, and temporarily stores an original image obtained through the reading into the image memory 26. The controller 31 causes the image forming device 12 to form the original image on recording paper, and discharges the recording paper to the discharge tray 19.

It is assumed that the user operates the GUI on the screen of the display device 21 via the touch panel 23 to input a selection instruction for selecting a scan job, sets an original in the image reading device 11, and operates the start key of the operation device 22 to input a scan instruction. In this case, the controller 31 causes the image reading device 11 to read the original according to the input selection instruction and scanning instruction, and temporarily stores an original image obtained through the reading into the image memory 26. The controller 31 stores the original image in a USB memory or a main body memory (storage device 28) connected to the image forming apparatus 10, or transmits the original image from the network communication device 24 to another terminal apparatus.

When the user operates the GUI on the screen of the display device 21 via the touch panel 23 to input a selection instruction for selecting a facsimile job, sets an original in the image reading device 11, and operates the start key of the operation device 22 to input a facsimile instruction, the controller 31 causes the image reading device 11 to read the original according to the input selection instruction and facsimile instruction, and temporarily stores an original image obtained by reading the original into the image memory 26. The controller 31 causes the facsimile communication device 25 to transmit the original image to another image forming apparatus or facsimile apparatus.

Here, it is desirable that a copy job is restricted depending on details of an original image, such as when an original or details written on the original are highly confidential. However, a provider of the original cannot know that the original has been copied simply by restricting the copy job of the original. From the viewpoint of confidentiality, it is desirable to be able to restrict the original to not only a copy job but also a scan job (storage in the USB memory or the storage device 28 or transmission to another terminal apparatus) and a facsimile job (facsimile transmission to another image forming apparatus or facsimile apparatus).

Therefore, the image forming apparatus 10 has a document management mode in which a two-dimensional code (for example, a QR code (registered trademark) that is an example of a "code" in the claims)) for managing an original and an original image is assigned to the original image obtained by reading the original in the image reading device 11. The image forming apparatus 10 uses the QR code to restrict a copy job, a scan job, and a facsimile job for an original, and notifies a provider of the original that these jobs have been executed.

In a state in which this document management mode is set in the image forming apparatus 10, the controller 31 causes the image reading device 11 to read an original (an example of a "document" in the claims), and stores an original image (an example of an "image indicated by a document" in the claims) obtained by reading the original in the image memory 26. In a case where this original is an original copy (original deed), a QR code is not written on this original. By the user operating the GUI on the screen of the display device 21, the controller 31 receives input of permission or prohibition of a job related to the original, the restricted number of executions of a job, and an email address of the provider who has provided the original via the touch panel 23. The controller 31 generates a QR code including information indicating the received permission or prohibition of a job, restricted number of executions of a job, and email address. The controller 31 combines and assigns the QR code with and to the original image stored in the image memory 26, causes the image forming device 12 to form the original image including the QR code on recording paper, and discharges the recording paper to the discharge tray 19.

The controller 31 uses a well-known QR code detection technique such as pattern matching to determine whether or not the QR code is included in the original image through analysis of the original image obtained by reading the original in the image reading device 11. In a case where the controller 31 determines that the QR code is already included in the original image, the controller 31 detects the QR code in the original image, and determines permission or prohibition of a job, the restricted number of executions of a job, an email address, and the like indicated by the QR code through analysis of the QR code.

When the permission of a job is determined, the controller 31 executes the copy job, the scan job, or the facsimile job for which an instruction is given on the original image, and further restricts the number of executions the job is executed to the restricted number of executions. The controller 31 creates an email indicating that the job has been executed, sets a destination of the email to the email address determined above, and transmits the email from the network communication device 24 to a server on a network.

In a case where the prohibition of the job is determined through the analysis of the QR code, the controller 31 erases the original image in the image memory 26, does not perform the copy job, the scan job, or the facsimile job for which an instruction is given, creates an email indicating that the job is prohibited, sets a destination of the email to the determined email address, and transmits the email to the server on the network via the network communication device 24.

The above email is received by the server, and is transmitted from the server to a terminal apparatus of the provider of the original according to the above set email address. In the terminal apparatus, details of the above email are displayed on a display device thereof. Therefore, the provider of the original can view the email and know an execution status of the copy job, the scan job, or the facsimile job related to the original.

Figure 3:
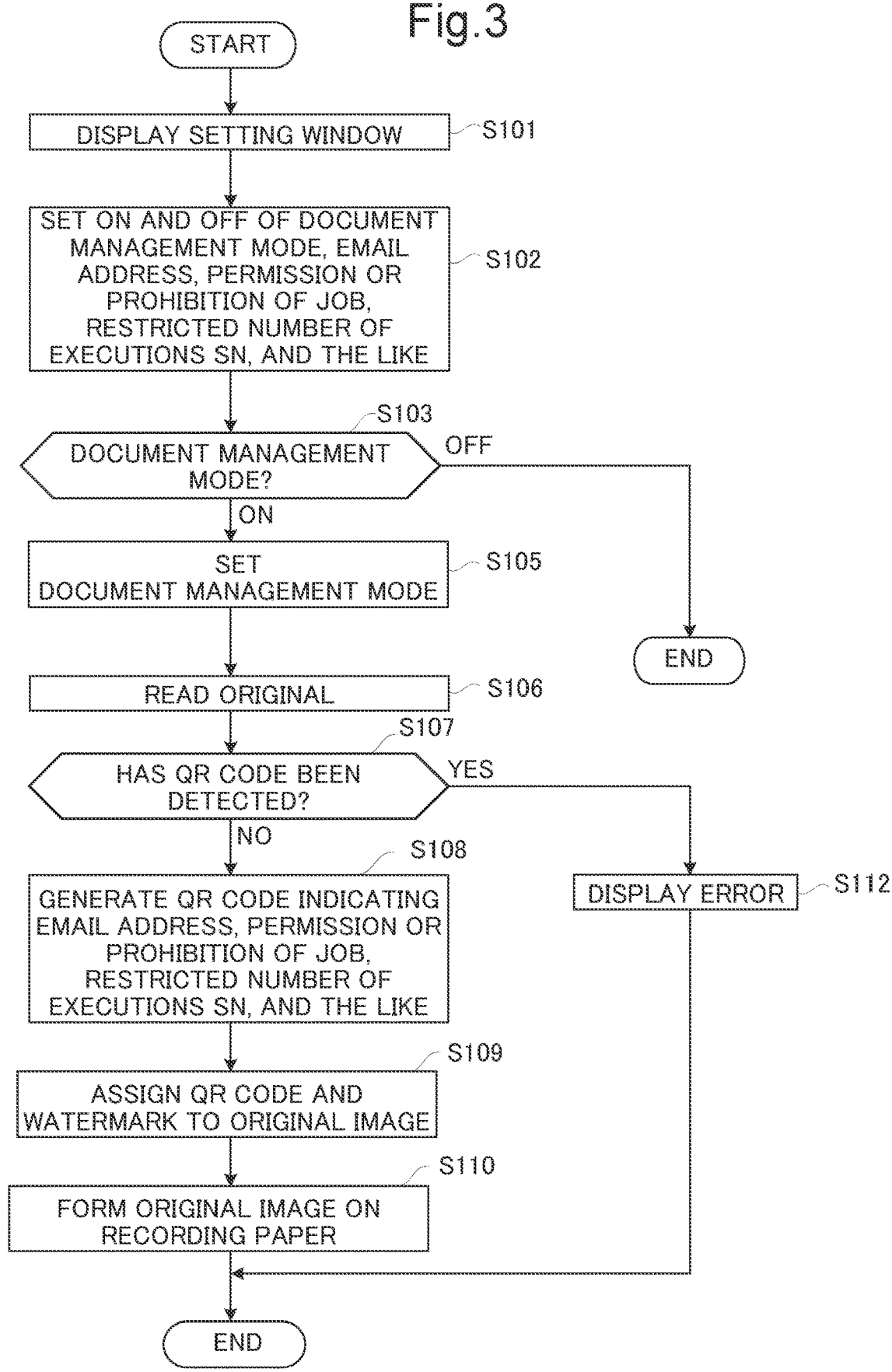
FIG. 3 is a flowchart illustrating a process for attaching a QR code (registered trademark) to an original image.

Next, a process of assigning such a QR code to the original image will be described in detail with reference to a flowchart of FIG. 3.

The user inputs an instruction for setting the document management mode by performing an operation of touching the GUI (for example, an initial setting screen) displayed on the screen of the display device 21. The controller 31 displays a setting window PW (an example of a GUI) for setting the document management mode on the screen of the display device 21 as illustrated in FIG. 4 according to the input instruction (S101).

Figure 4:
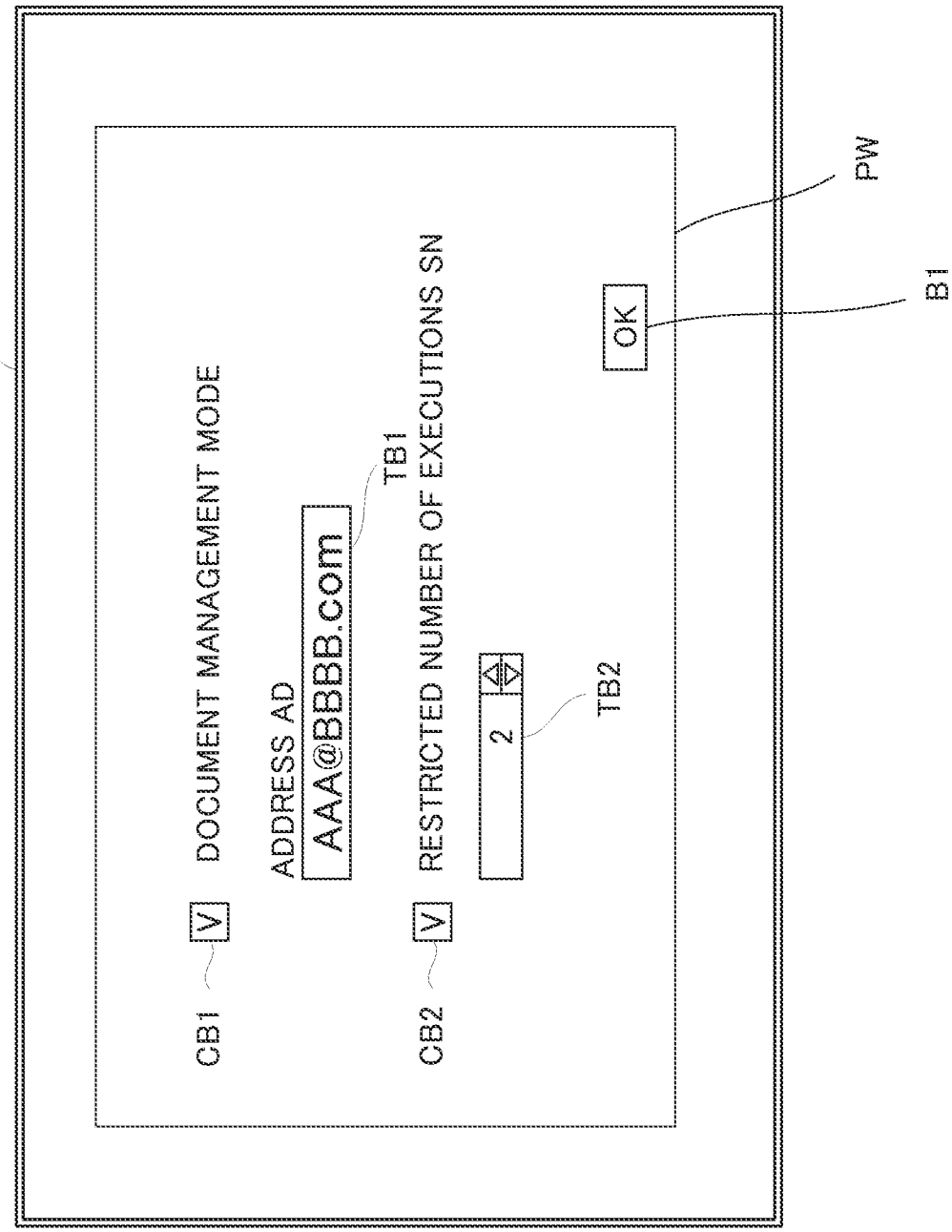
FIG. 4 is a diagram illustrating a document management mode setting screen displayed on a display device.

A check box CB1 for receiving an instruction for switching the document management mode on and off, a text box TB1 for receiving input of an email address AD of a provider of an original, a check box CB2 for receiving an instruction for permission or prohibition of a copy job, and a scan job, and a facsimile job, and a text box TB2 for receiving input of a restricted number of executions SN of a copy job, a scan job, or a facsimile job are displayed on the setting window PW illustrated in FIG. 4.

The user inputs an instruction for turning on the document management mode by operating the check box CB1, or inputs an instruction for turning off the document management mode by not operating the check box CB1. The user operates a software keyboard (not illustrated) displayed on the screen of the display device 21 to input his/her email address AD into the text box TB1. The user inputs a job permission instruction by operating the check box CB2, or inputs a job prohibition instruction by not operating the check box CB2. The user further inputs the restricted number of executions SN of the job by operating the text box TB2. For such input, the controller 31 receives input details of each of the above items when an input confirmation instruction is received by the touch panel 23 by the user operating an OK button B1.

The controller 31 determines details indicated by the on or off instruction for the document management mode, the email address in the text box TB1, the instruction for permission or prohibition of the job, and the restricted number of executions SN of the job in the text box TB2 (S102).

For example, when it is determined that the document management mode off instruction has been received through the determination in S102 (S103, "off"), the controller 31 does not set the document management mode. In this case, when the user operates the GUI on the screen of the display device 21 via the touch panel 23, inputs an instruction for selecting a copy job, a scan job, or a facsimile job, sets an original in the image reading device 11, and operates the start key of the operation device 22 to input a job execution instruction, the controller 31 causes the image reading device 11 to read the original, temporarily stores an original image obtained by reading the original into the image memory 26, and executes the copy job, the scan job, or the facsimile job selected by the user on the original image. Thereafter, the process illustrated in FIG. 3 ends.

When it is determined that the document management mode on instruction has been received through the determination in S102 (S103, "on"), the controller 31 sets the image forming apparatus 10 to the document management mode (S105).

It is assumed that, in a state in which the document management mode is set, the user operates the GUI on the screen of the display device 21 via the touch panel 23, inputs an instruction for selecting a copy job, a scan job, or a facsimile job, and sets an original in the image reading device 11, and operates the start key of the operation device 22 to input a copy execution instruction. In this case, the controller 31 causes the image reading device 11 to read the original, and temporarily stores an original image obtained by reading the original into the image memory 26 (S106). The controller 31 analyzes the original image in the image memory 26 and performs a process of detecting the QR code included in the original image (S107).

Here, it is assumed that the above original is an original copy (original deed) provided by the user and is not assigned with a QR code.

In this case, the controller 31 does not detect a QR code from the original image (S107, "No"), and generates a QR code including information indicating that the original is an original copy together with information indicating the email address AD, the permission or prohibition of the job, and the restricted number of executions SN of the job determined in S102 (S108). The controller 31 combines the QR code with the original image (a margin region (a region in which pixels are not present) in the original image), and further combines a preset watermark with the original image (S109). Consequently, the original image has the QR code and the watermark assigned thereto.

The controller 31 causes the image forming device 12 to form the original image assigned with the QR code and the watermark on recording paper, and discharges the recording paper to the discharge tray 19 (S110). Thereafter, the process illustrated in FIG. 3 ends.

In a case where the controller 31 has received an instruction for selecting a scan job or a facsimile job from the user, the controller 31 forms the original image assigned with the QR code and the watermark on recording paper (S110), and also executes a scan job or a facsimile job on the original image assigned with the QR code and the watermark.

Here, the original image stored in the USB memory or the storage device 28 through the scan job or transmitted to another terminal apparatus and the original image transmitted through the facsimile job may be formed on the recording paper and used in the same manner as in S110.

Figure 5:
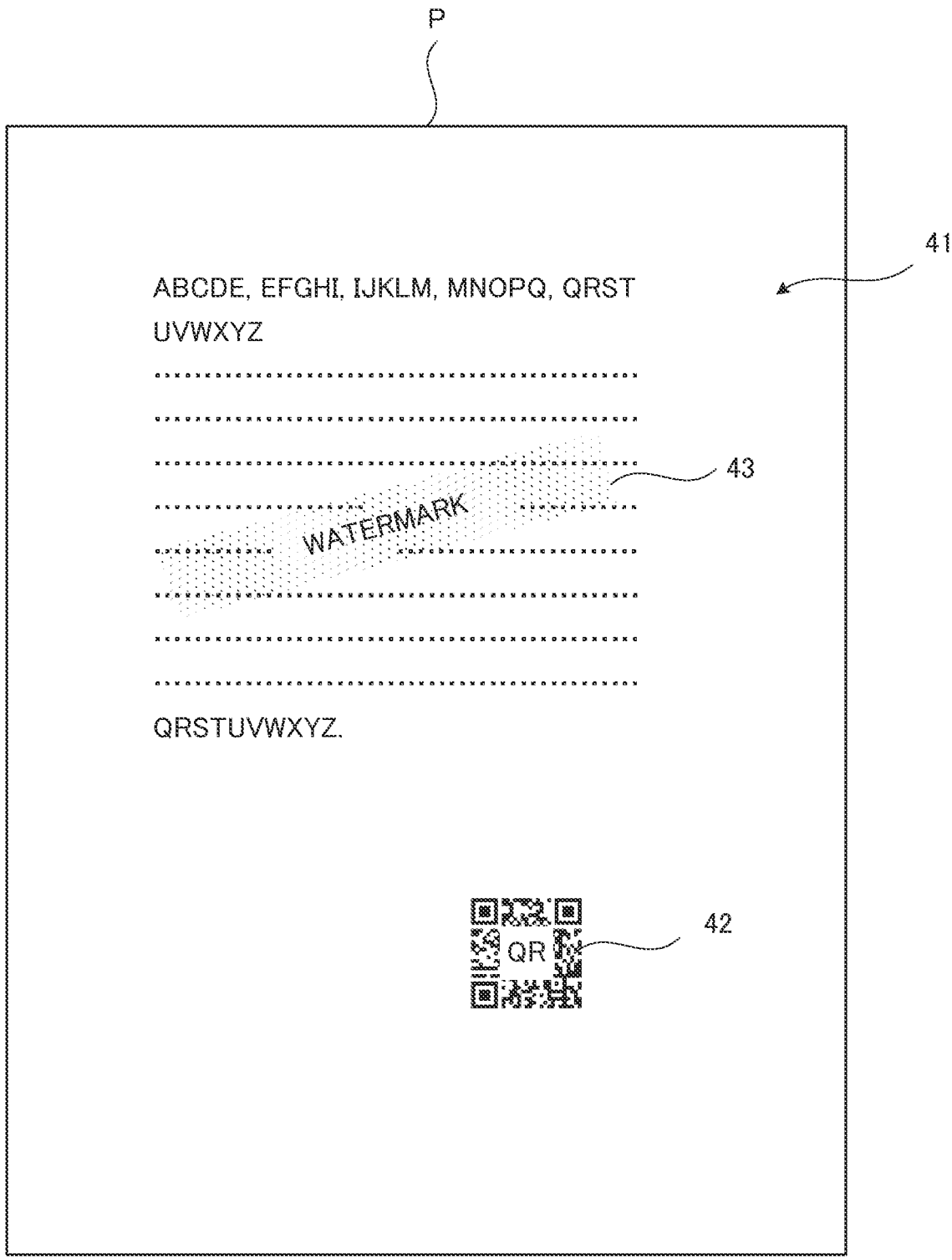
FIG. 5 is a diagram exemplifying recording paper on which an original image, a QR code, and a watermark are formed.
Figure 6:
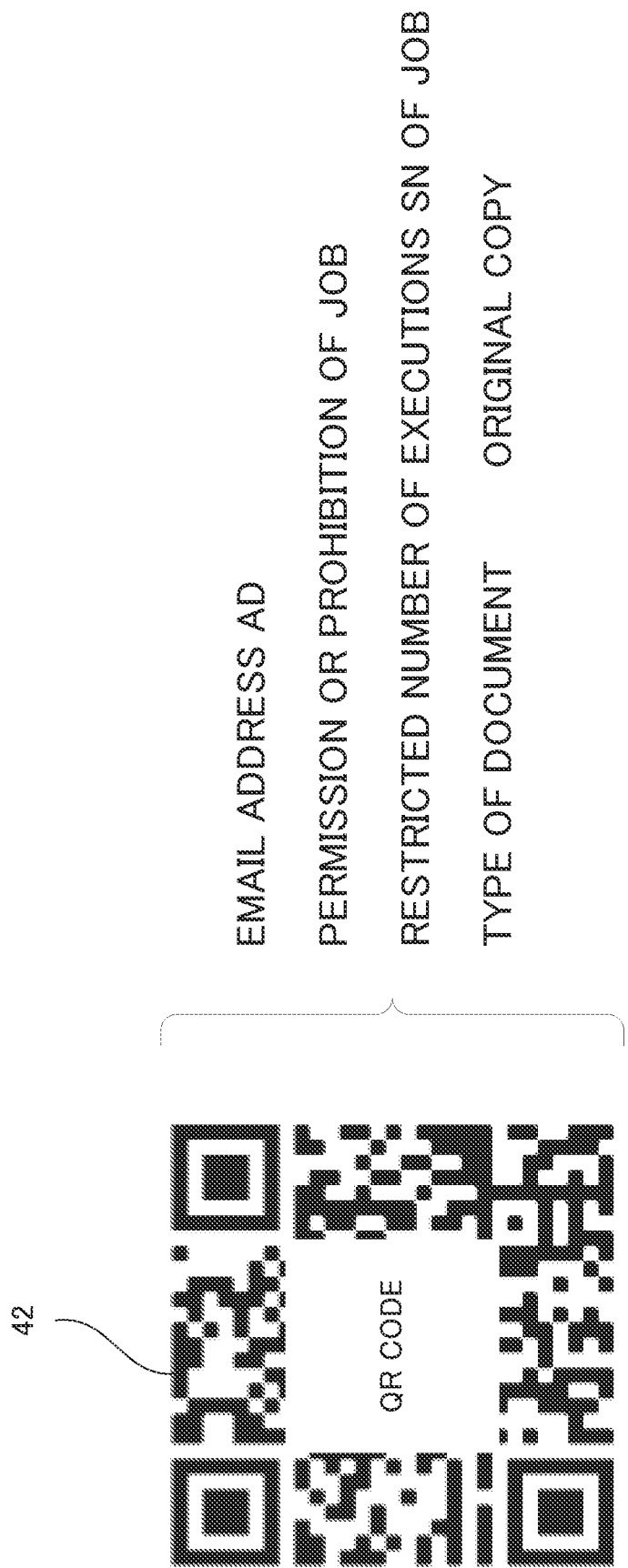
FIG. 6 is a diagram exemplifying information indicated by the QR code in FIG. 5.

In a case where the original image is formed on the recording paper P, for example, as illustrated in FIG. 5, an original image 41, a QR code 42 combined in a margin region in the original image 41, and a watermark 43 combined to be overlaid on the original image 41 are formed on the recording paper P. As illustrated in FIG. 6, the QR code 42 formed on the recording paper P as described above includes information indicating the email address AD, the permission or prohibition of the job, the restricted number of executions SN of the job, and whether the original is an original copy.

On the other hand, in S107, in a case where the controller 31 detects the QR code combined with in the original image (S107, "Yes"), that is, in a case where the original is not an original copy, the controller 31 does not process the processes in S108 to S110, and displays an image indicating an error on the screen of the display device 21 (S112). Thereafter, the process illustrated in FIG. 3 ends.

When a provider of an original causes the image forming apparatus 10 to execute a copy job, a scan job, or a facsimile job on the original corresponding to an original copy in a state in which the document management mode is set as described above, a QR code and a watermark are assigned to an original image obtained by reading the original, the original image assigned with the QR code and the watermark is formed on recording paper, and the recording paper is discharged to the discharge tray 19. In the present embodiment, in S109, the controller 31 combines both the QR code and the watermark with the original image, but the controller 31 may combine only the QR code with the original image without combining the watermark. However, in the present embodiment, the description will be made by taking as an example a case where both the QR code and the watermark are combined with the original image.

Next, with reference to a flowchart of FIG. 7, a detailed description will be made of a process in which a QR code is detected from an original image obtained by reading an original, a job for the original is restricted on the basis of the QR code, and a provider of the original is notified by email that the job has been executed or prohibited.

It is assumed that another user different from a provider of an original corresponding to an original copy operates the GUI on the screen of the display device 21 to input an instruction for selecting a copy job, a scan job, or a facsimile job, sets the original in the image reading device 11, and operates the operation device 22 to input a job execution instruction. In this case, the controller 31 causes the image reading device 11 to read the original according to both the input instructions (S201), and temporarily stores an original image obtained by reading the original into the image memory 26. The controller 31 analyzes the original image in the image memory 26 and performs a process of detecting a QR code from the original image (S202).

Figure 7:
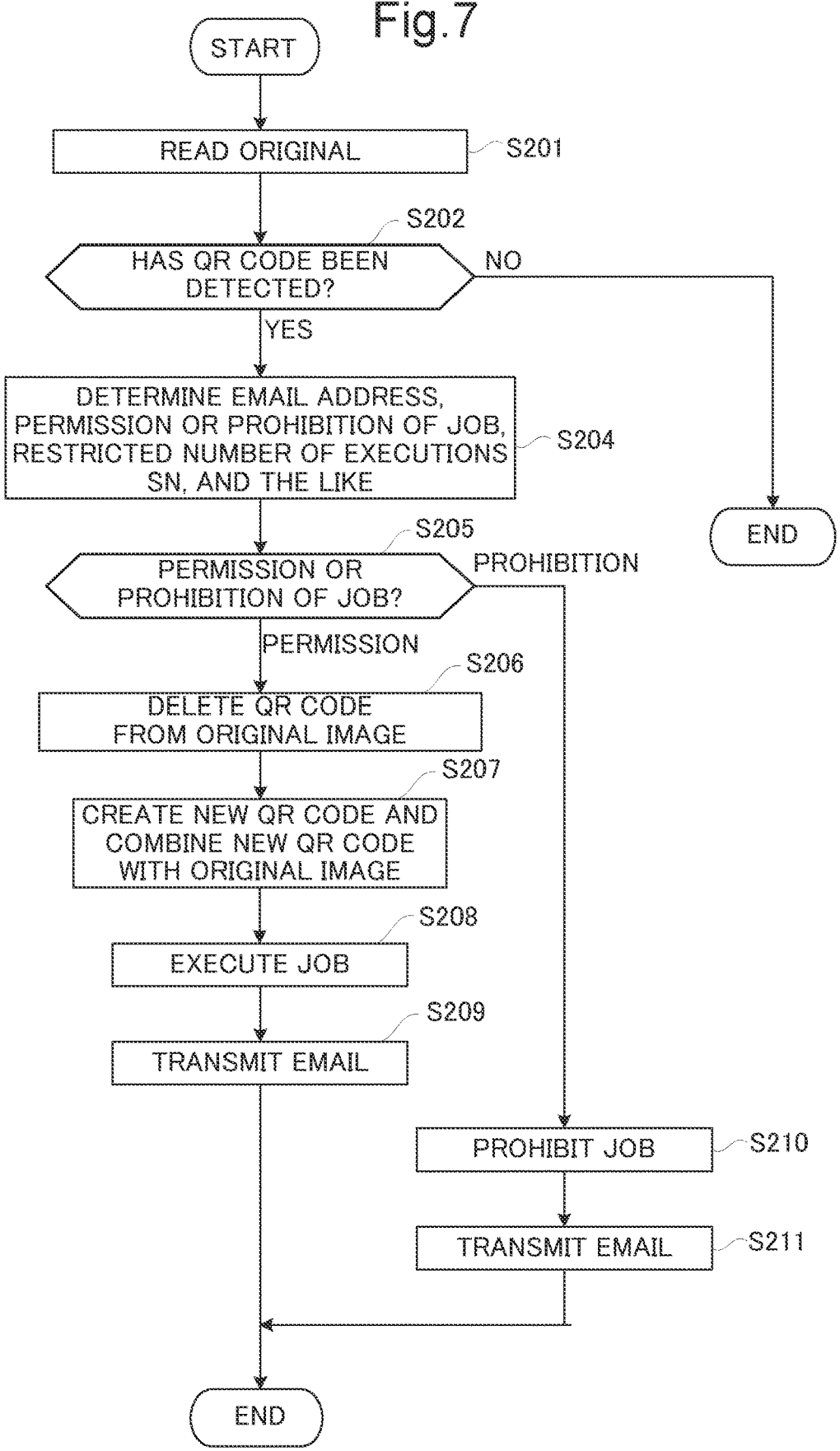
FIG. 7 is a flowchart illustrating a process for detecting a QR code from an original image, restricting a job related to an original on the basis of the QR code, and notifying a provider of the original by email that the job has been executed.

For example, if a QR code is not detected (S202, "No"), the controller 31 does not perform the processes in and after S204, and finishes the process illustrated in FIG. 7. In this case, the controller 31 executes the copy job, the scan job, or the facsimile job selected by the user on the original image in the image memory 26.

In a case where a QR code is detected (S202, "Yes"), the controller 31 analyzes the QR code and determines the email address AD, the permission or prohibition of the job, the restricted number of executions SN of the job, and the like indicated by the QR code (S204).

In this case, when the permission of the job is determined (S205, "permission"), the controller 31 deletes the detected QR code from the original image (S206). For example, a process of replacing all the pixels in the QR code region of the original image with white is performed on the original image. The controller 31 generates an identification number ID of the original image, generates a new QR code including information indicating the identification number ID together with information indicating the email address AD, the permission or prohibition of the job, and the restricted number of executions SN of the job determined in S204, and combines the new QR code with the original image (the margin region in the original image) (S207). The controller 31 does not delete the watermark included in the original image, but leaves the watermark as it is. Therefore, the original image in the image memory 26 is assigned with the new QR code, and has the watermark remaining hitherto.

Subsequently, the controller 31 executes the copy job, scan job, or facsimile job selected by another user on the original image in the image memory 26 by restricting the number of executions of the job to the restricted number of executions SN or less of the job determined in S204 (S208). For example, in the case of the copy job, the number of copies of recording paper on which the original image is recorded is restricted to the restricted number of executions SN or less. In the case of the scan job, the number of storage destinations in which the original image is stored is restricted to the restricted number of executions SN or less. In the case of the facsimile job, the number of transmission opposite parties to which the original image is transmitted is restricted to the restricted number of executions SN or less.

Figure 8:
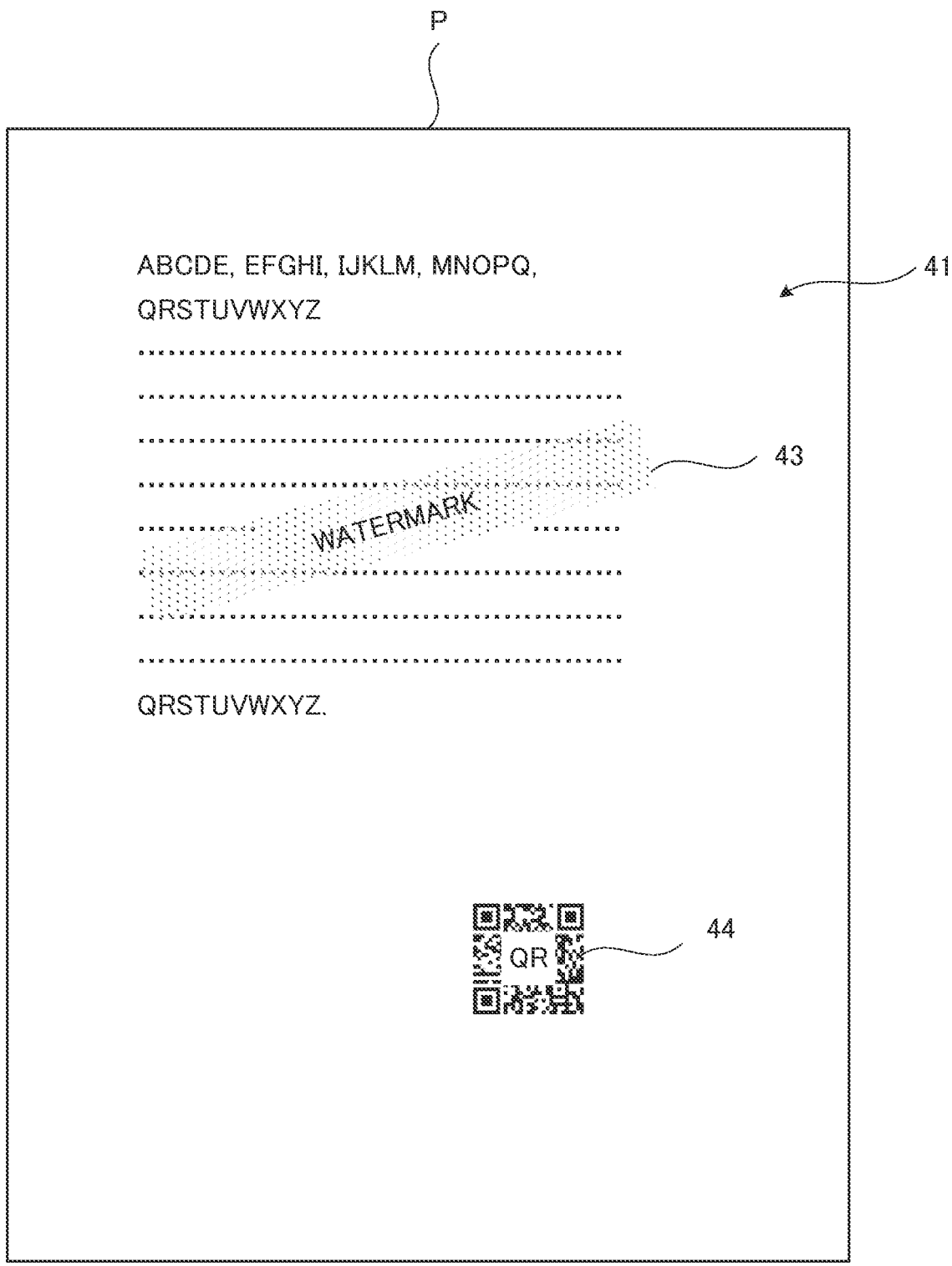
FIG. 8 is a diagram exemplifying recording paper on which an original image, a QR code, and a watermark are formed.
Figure 9:
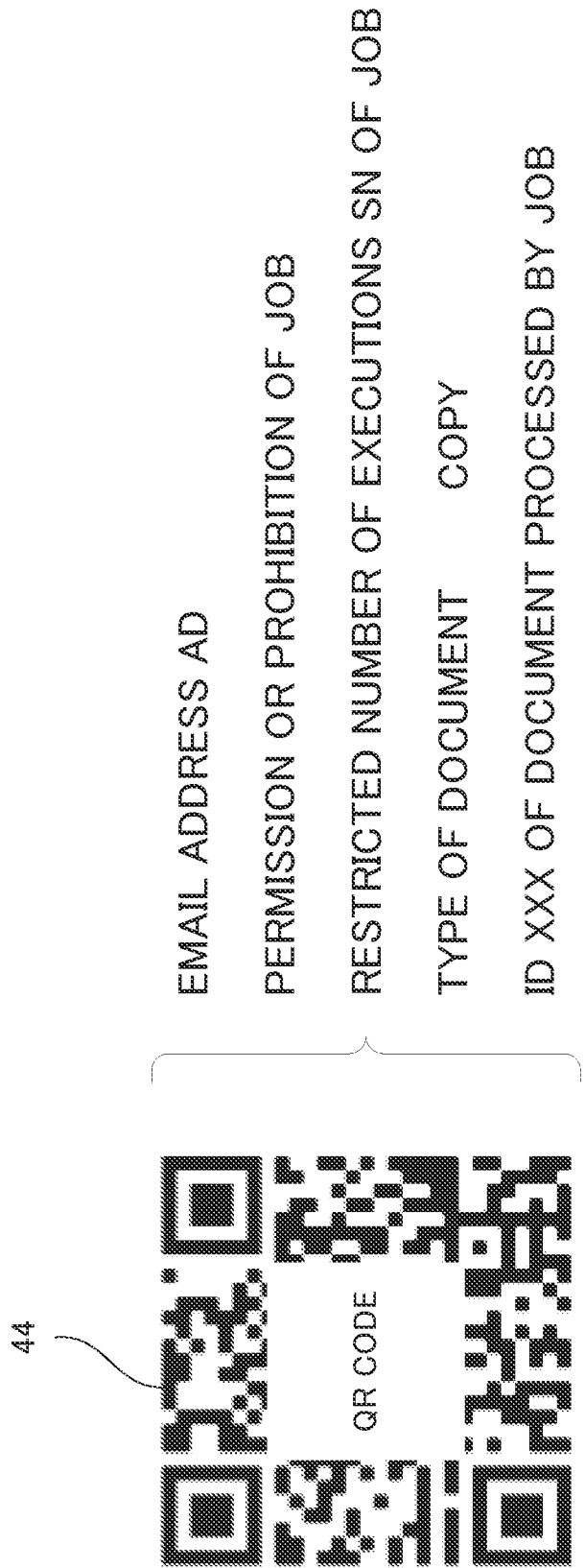
FIG. 9 is a diagram exemplifying information indicated by the QR code in FIG. 8.

For example, in a case where the copy job is executed, as illustrated in FIG. 8, the original image 41 having a new QR code 44 and a watermark 43 hitherto is formed on the recording paper P. As illustrated in FIG. 9, the QR code 44 includes information indicating the email address AD, the permission or prohibition of the job, the restricted number of executions SN of the job, and the identification number ID.

The controller 31 creates an email indicating that the job has been executed on the original to be read in S201, the number of executions JN of the job, the type of the job, and the like, sets a destination of the email to the email address AD determined in S111, and transmits the email to the email address AD via the network communication device 24 (S209). Thereafter, the process illustrated in FIG. 7 ends.

For example, in a case where the copy job is executed, an email EM1 as illustrated in FIG. 10 is transmitted under the control of the controller 31. The email EM1 illustrated in FIG. 10 includes information indicating execution of the job, the number of executions JN of the job, that the executed job is a copy job, that the original on which the job is executed is an original copy, the identification number ID of the original image, and an IP address of the image forming apparatus 10. The IP address of the image forming apparatus 10 is stored in the storage device 28, and is read from the storage device 28 and used by the controller 31.

On the other hand, in a case where the controller 31 executes a job on the original image assigned with the QR code including information indicating that the original is a copy, the email EM1 includes the information indicating that the original is a copy. The controller 31 may acquire an address of another terminal apparatus used when the original image is transmitted from the network communication device 24 to the other terminal apparatus by executing the scan job and cause the address of the other terminal apparatus to be included in the email EM1, or may acquire a facsimile number of a facsimile apparatus used when the original image is transmitted from the facsimile communication device 25 to the facsimile apparatus by executing the facsimile job and cause the facsimile number to be included in the email EM1.

When prohibition of the job is determined in S205 (S205, "prohibition"), the controller 31 erases the original image in the image memory 26 and does not execute a copy job, a scan job, or a facsimile job on the original image (S210). The controller 31 further creates an email indicating that the job is prohibited, sets a destination of the email to the email address determined in S204, and transmits the email to an opposite party indicated by the email address via the network communication device 24 (S211). Thereafter, the process illustrated in FIG. 7 ends.

Figure 11:
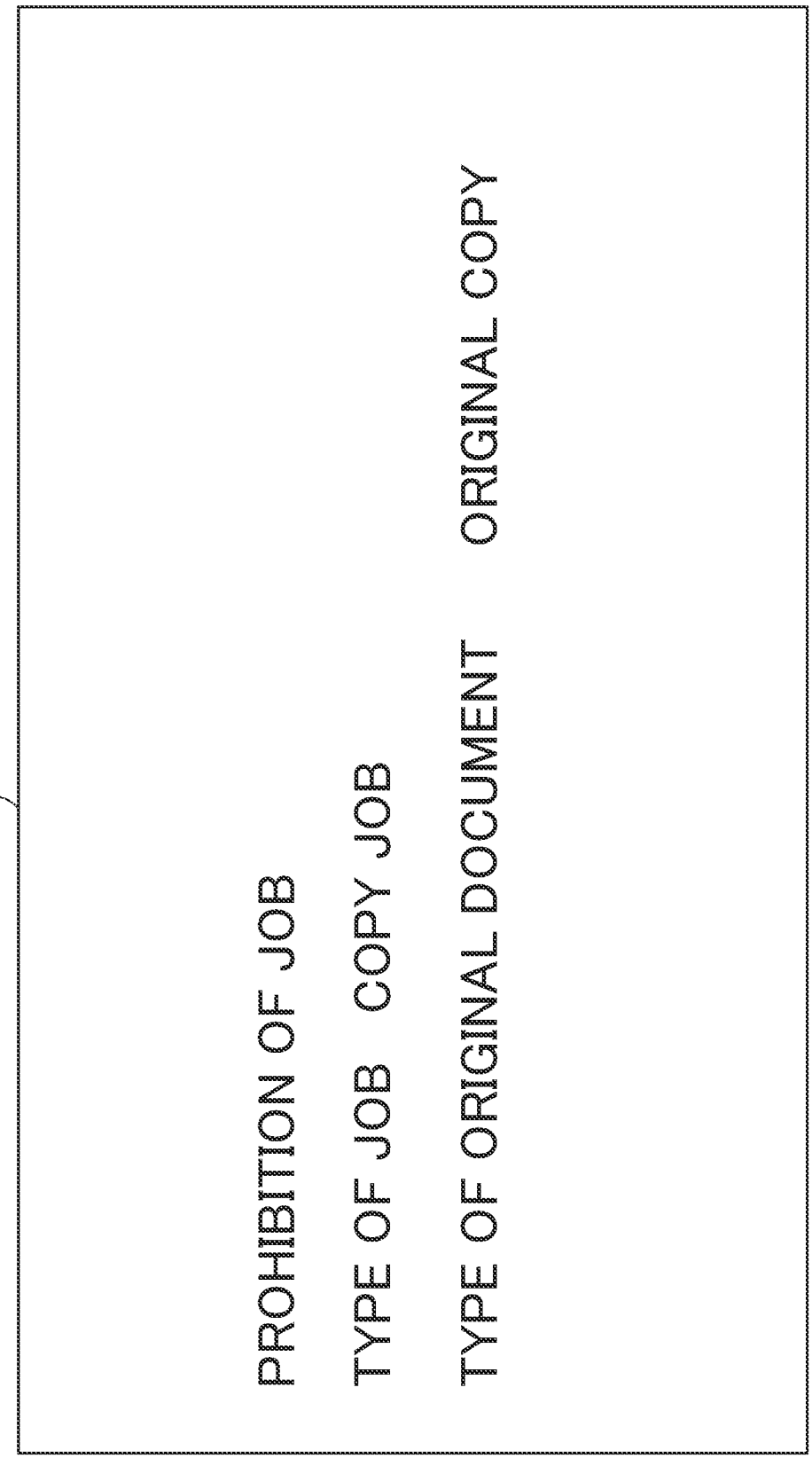
FIG. 11 is a diagram exemplifying an email transmitted to the provider of the original in a case where the job related to the original is prohibited.

For example, in a case where the copy job is prohibited, the controller 31 creates and transmits an email EM2 as illustrated in FIG. 11. The email EM2 illustrated in FIG. 11 includes information indicating that the job is prohibited, the job type is a copy job, and the original is an original copy.

As described above, in the present embodiment, a QR code indicating permission or prohibition of a job related to an original, the restricted number of executions of the job, and an email address of a provider who has provided the original is generated, and the QR code is assigned to an original image obtained by reading the original, the QR code is detected from the original image, the job related to the original is executed or prohibited on the basis of the QR code, and the provider of the original is notified by email that the job has been executed or prohibited. Therefore, the provider of the original can view the email and know an execution status of the job related to the original provided by himself/herself.

Here, since the image forming apparatus described in BACKGROUND prohibits output of the original image on the basis of the control information extracted from the code, copying of the original image can be restricted by assigning the code to the original image in advance. However, a user who has provided the original image cannot know that the original image has been copied simply by restricting the copying of the original image. For an original image for which confidentiality is desired, it is necessary to manage the use not only for copying but also for storage in a memory and transmission via a network. In contrast, according to the above embodiment, it is possible to restrict a job to be performed on a document and allow a document provider to check that a job has been executed on the document.

Incidentally, in the above embodiment, a QR code is exemplified, but instead of a QR code, another type of two-dimensional code or a one-dimensional code such as a bar code may be applied.

In the above embodiment, a copy job, a scan job, and a facsimile job are collectively permitted or prohibited, but a job may be permitted or prohibited according to the type of job. In this case, the controller 31 generates a QR code indicating permission or prohibition of a job for each of a copy job, a scan job, and a facsimile job, and assigns this QR code to an original image. When the QR code is detected from the original image, the controller 31 analyzes the detected QR code, determines whether a job is permitted or prohibited for each of a copy job, a scan job, and a facsimile job, and executes or prohibits the job.

In the above embodiment, a QR code is assigned to an original image obtained by reading an original in the image reading device 11, but when a document is transmitted from another terminal apparatus and received by the network communication device 24 or the facsimile communication device 25, and a job is performed on this document, the controller 31 may assign a generated QR code to an image indicated by the document. Alternatively, when a document created by a PC is transmitted from the PC and received by the network communication device 24, and a job is performed on this document, the controller 31 may assign a generated QR code to an image indicated by the document.

In the above embodiment, the image forming apparatus has been described as one embodiment of an information processing apparatus according to the present disclosure, but an information processing apparatus according to the present disclosure may be another type of apparatus. Other types of apparatuses include, for example, copiers and facsimile apparatuses.

The configuration and processing of the above embodiment described with reference to FIGS. 1 to 11 are merely examples of the present disclosure, and the present disclosure is not intended to be limited to the configuration and processing.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
   an input device to which an image indicated by a document is input;
   a communication device that communicates with other electronic apparatuses; and a control device that includes a processor, and functions as a controller by the processor executing a control program to
- detect a code indicating permission or prohibition of a job related to the document and a provider of the document from the input image, and determine the permission or prohibition of the job related to the document and the provider of the document on the basis of the detected code, and
- in a case where it is determined that the job related to the document is permitted, execute the job related to the document, and notify the provider that the job related to the document has been executed via the communication device, wherein the code further includes an email address of the provider, and the controller
- further determines the email address of the provider from the code, and
- when the job related to the document has been executed, provides a notification of information indicating that the job related to the document has been executed to the determined email address via the communication device.

2. The information processing apparatus according to claim 1, wherein
the controller sets the code indicating the permission or prohibition of the job related to the document and the provider of the document, and performs a process of assigning the set code to the image indicated by the document.

3. The information processing apparatus according to claim 2, wherein
the code further includes information indicating that the document is an original copy.

4. The information processing apparatus according to claim 2, wherein
when the job related to the document has been executed, the controller erases the code from the document, sets a new code indicating an identifier of the document, the permission or prohibition of the job related to the document, and the provider of the document, and assigns the new code to the image indicated by the document.

5. The information processing apparatus according to claim 2, further comprising:
an operation device to which a selection instruction for selecting a scan job or a facsimile job is input; and
an image forming device that forms an image on a recording medium, wherein
the controller performs a process of assigning the set code to the image indicated by the document, then executes a job indicated by the selection instruction input to the operation device by using the image assigned with the set code, and further causes the image forming device to form the image assigned with the set code on the recording medium.

6. The information processing apparatus according to claim 1, wherein
the code further includes a restricted number of executions of the job related to the document, and
the controller
- further determines the restricted number of executions of the job related to the document from the code, and
- in a case where the permission of the job related to the document is determined on the basis of the code, executes the job related to the document within the determined restricted number of executions.

7. The information processing apparatus according to claim 6, wherein
the controller notifies the number of executions of the job related to the document to the determined provider via the communication device.

8. The information processing apparatus according to claim 1, wherein
in a case where the prohibition of the job related to the document is determined, the controller notifies the determined provider that the job related to the document is prohibited via the communication device.

9. The information processing apparatus according to claim 1, wherein
the controller further assigns a watermark to the document when the code is assigned to the image indicated by the document.

10. A document management method comprising:
an input step of inputting an image indicated by a document;
a detection step of detecting a one-dimensional or two-dimensional code indicating permission or prohibition of a job related to the document and an email address of a provider of the document from the image input in the input step;
a determination step of determining the permission or prohibition of the job related to the document and the email address of the provider of the document on the basis of the one-dimensional or two-dimensional code detected in the detection step;
a processing step of, in a case where the permission of the job related to the document is determined in the determination step, executing the job related to the document; and
a notification step of, when the job related to the document is executed in the processing step, notifying to the email address of the provider determined in the determination step that the job related to the document has been executed.

* * * * *